Nov. 20, 1956  M. LEE ET AL  2,770,818
METHOD OF FORGING A SLOTTED BOLT
Filed May 2, 1955  2 Sheets-Sheet 2
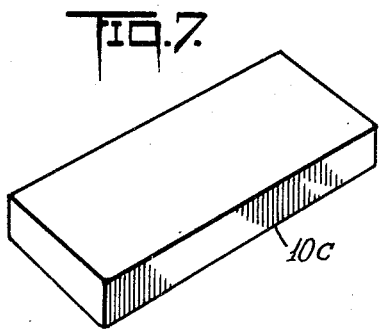
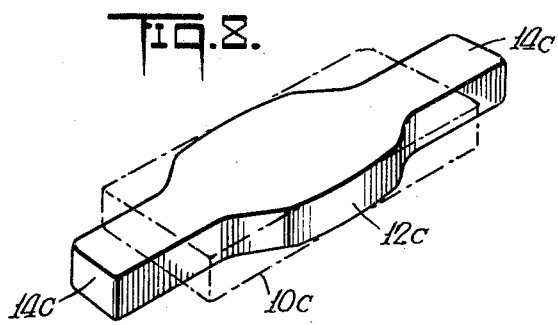
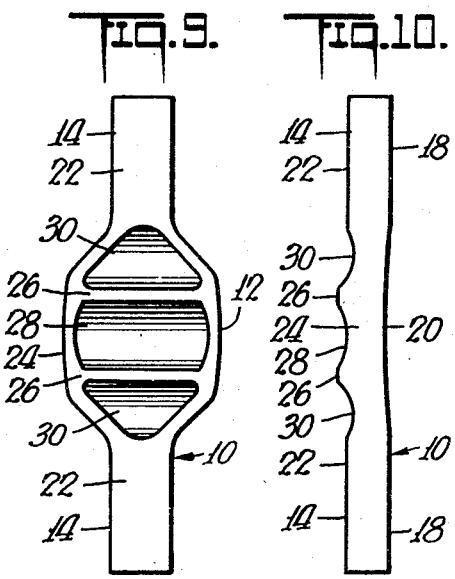
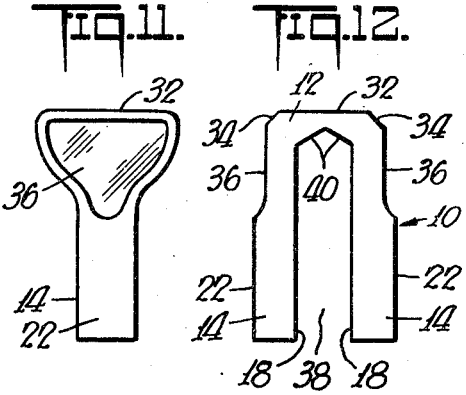
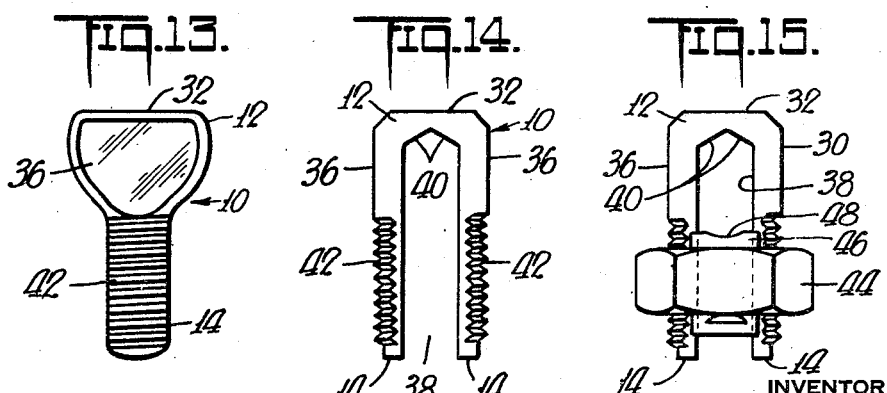
INVENTORS
Marvin Lee
Christian V. Pellier
BY
Harry Ernest Rubins
ATTORNEY

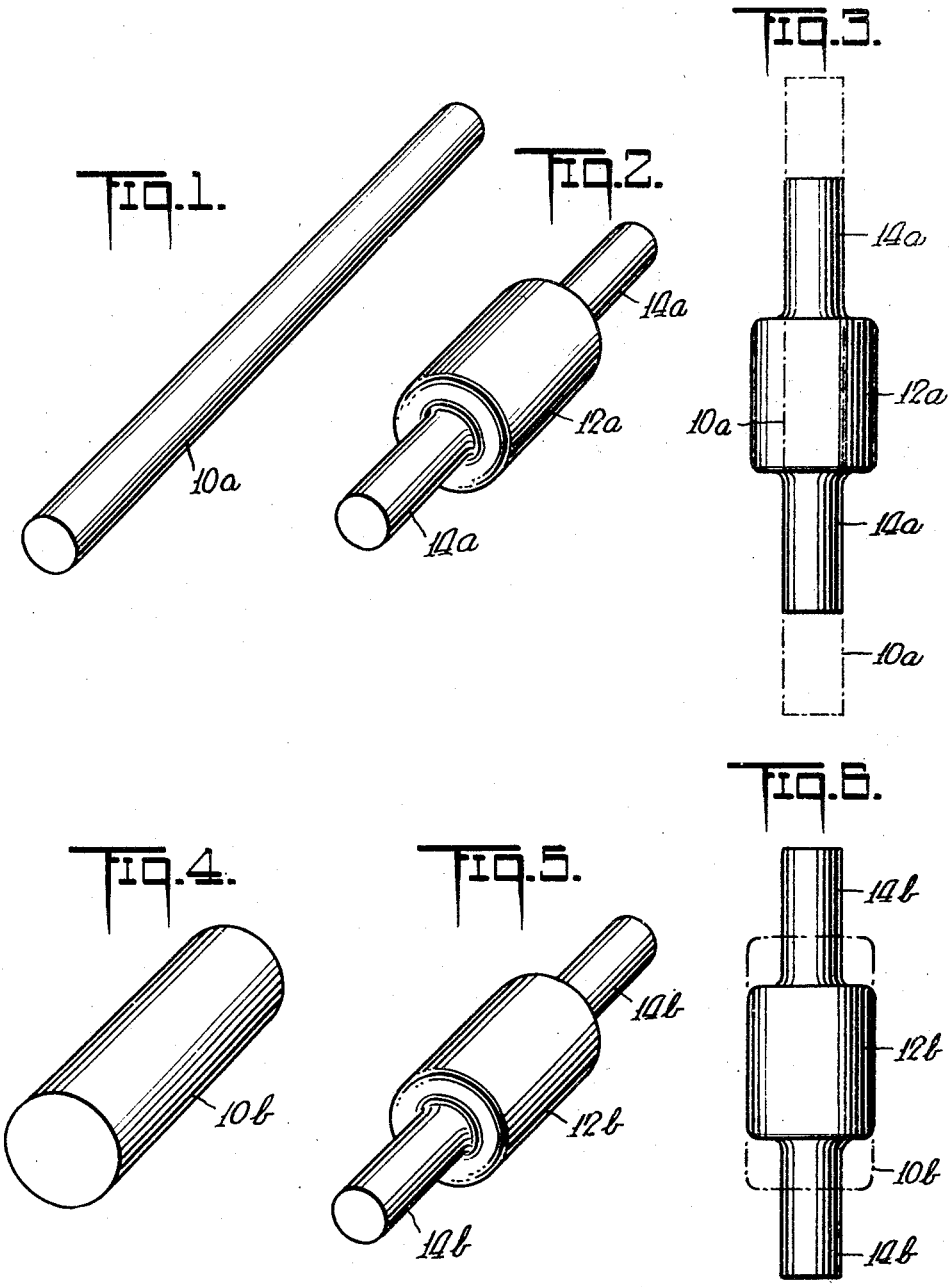

United States Patent Office 2,770,818
Patented Nov. 20, 1956

2,770,818

METHOD OF FORGING A SLOTTED BOLT

Marvin Lee, Wilton, and Christian V. Pellier, Westport, Conn., assignors to Burndy Engineering Co., Inc., a corporation of New York Application May 2, 1955, Serial No. 505,239

2 Claims. (Cl. 10—27)

This invention relates to the manufacture of connectors and more particularly to the manufacture of slotted connectors of the type disclosed in the Dibner Patent Re. 20,096, granted September 8, 1936.

Such connectors consist of a slotted bolt, a single nut and a follower mounted about and in the bore of the nut. The wires or cables to be connected are clamped between the under side of the head or bridge of the bolt at the inner end of the slot by screwing the nut on the two legs of the slotted bolt and causing the follower to engage the other side of the wires.

As disclosed in the Dibner patent, such devices can be made by swedging a rod directly into a blank having one flat surface and one arcuate surface with an intermediate portion of greater width than the end portions, the excess flashing being trimmed off as waste. This blank is then bent to U-shape, the wider intermediate portion forming the head or bridge and the end portions forming the legs or shanks spaced from each other a predetermined distance to form the slot. The outer faces of the legs are then threaded for the reception of the nut. It was later determined in the Dibner et al. Patent 2,164,006 granted June 27, 1939 that a slotted bolt could be produced more economically and of satisfactory strength by stamping the blank directly from sheet metal. Such blanks also contain an intermediate portion of greater width than the end portions, which permits a needed support for the clamped cables. One side of each of the end portions is rounded and the bolt is finished by substantially the same operations as is employed in the forging process.

Stamping the slotted bolt blank from sheet metal stock with an intermediate portion of greater width than the end portions also produces quantities of scrap metal, which is uneconomical. The loss in market value from the original copper stock to the copper scrap, per unit of manufacture is a considerable portion of the cost of the flattened blank.

The principal objects of our invention therefore are to provide a practical method of manufacturing slotted bolt connectors with a minimum of waste, with a finish that does not expose the soft and weaker inside material as is done by a milling operation, and which produces a minimum flow in the head of the bolt.

We accomplish these and other objects and obtain our new results as will be apparent from the article and method of manufacturing the same described more or less diagrammatically in the following specification, particularly pointed out in the claims, and illustrated in the accompanying drawing in which:

Fig. 1 is a perspective view of a piece of rod or round stock from which the slotted bolt may be made;

Fig. 2 is a similar view of the rod following an upsetting operation by means of which the diameter of the intermediate portion is increased;

Fig. 3 is an elevation view of the upset rod illustrated in Fig. 2, indicating in dot-dash lines the original dimensions of the rod of Fig. 1;

Figs. 4 and 5 are perspective views of a piece of rod or round stock of increased diameter over that shown in Fig. 1, from which a similar blank as is shown in Fig. 3 is made, by rolling the end portions;

Fig. 6 is an elevation view of the rolled rod of Fig. 5 indicating in dot-dash lines the original dimensions of the rod of Fig. 4;

Fig. 7 is a perspective view of a piece of rod of rectangular cross-section from which the slotted bolt may be made;

Fig. 8 is a perspective view of the rod after its two end portions have been laterally compressed to change their width and length, the original positions being indicated by dot-dash lines.

Figs. 9 and 10 are top and side elevation views respectively of the blank, after swedging and prior to bending;

Figs. 11 and 12 are front and side elevation views respectively of the blank bent into a slotted bolt;

Figs. 13 and 14 are front and side elevation views respectively of the slotted bolt after threading; and Fig. 15 is a side elevation of the assembled bolt, nut, and follower forming the complete connector.

Referring to the drawing, in Fig. 1 we have shown a piece of rod 10a which has been cut to the proper length for the manufacture of the slotted bolt of a desired size. In the first operation this rod is upset in a suitable apparatus, such as a header, to provide an intermediate portion 12a of increased diameter and end portions or legs 14a of substantially the same diameter as the stock 10a. The foregoing procedure results in a substantial redistribution of the metal to permit forming the head of the bolt from the enlarged upset portion, the original rod size furnishing the proper amount of metal for the legs. Thus the flashing from the forging operation such as is illustrated in Fig. 3 of the Dibner patent, or the remaining waste sheet metal from which the bolt is stamped, is avoided by our novel process.

Instead of upsetting a relatively thin rod to increase its intermediate diameter, we may, as illustrated in Figs. 4–6, use a thicker rod 10b, and roll its end portions 14b to form a similar blank to that shown in Fig. 2, wherein the intermediate portion 12b retains the diameter of the original rod 10b. The contrasting procedures are illustrated in Figs. 3 and 6 wherein the dot-dash lines indicate the original rod dimensions.

In Figs. 7 and 8 we have illustrated a modification of the method disclosed in Figs. 4 to 6, but instead of employing a cylindrical rod, we use a rod substantially rectangular in cross-section.

In the first operation, the original width of the rod 10c at the intermediate portion 12c is maintained, while the sides of the ends are laterally compressed to elongate them beyond their original position, shown in dot-dash lines, forming leg portion 14c in Fig. 8.

The foregoing procedure results in a substantial redistribution of metal to permit the intermediate portion 12c to form the head of the bolt, and the end portions to be restricted in width and elongated in length, while maintaining substantially the same thickness of the original rod to form the legs 14c.

Thus in each case from the original piece of the rod, we have provided the proper amount of metal for the intermediate portion and for the leg portions, without loss of any metal.

In swedging the final blank 10 of Figs. 9 and 10 from the roller-pin shapes of Figs. 2 and 4, we have found it desirable to pre-condition the roller-pins by a rolling operation more fully described in the patent of Roderic A. MacDonald, No. 2,676,390, entitled Method of Rolling an Upset Blank, which rolling operation produces a declivity around the central part of the intermediate portion 13 appearing as declivities 20 and 28 in the final blank.

This prevents excessive work-hardening of the metal which sometimes will cause cracking when the blank 10 is ultimately bent into the U-shape of Fig. 12.

In forming the blank of Fig. 9 we have found that the metal of the head section 12c which has not been subject to any substantial flow of the metal has not been work-hardened, which enables the subsequent swedging and bending operations to occur without cracking of the intermediate portion.

In the final blank 10 the bottom surfaces 18 of the two legs 14 are connected by a slightly curved portion 20, extending the width of the blank. The opposite or front surfaces 22 of the leg portions are connected by a bridge 24. In the swedging operation, the declivity 28 is reshaped on the side of the head 12 which forms the top of the bolt, providing two ribs 26, one on each side of the declivity 28. On opposite sides of the ribs between the head or bridge and the legs or shanks, the swedging operation provides concave portions 30.

After the flattening operation, the blank is bent into U-shape, as indicated in Figs. 11 and 12 of the drawing. The ribs 26 assist in determining the point of juncture between the outer flat surface 32, formerly declivity 28 of the head, and the shank or legs and result in the production of bevelled surfaces 34. Depending from each side of the head are portions 36 in which the concave portions 30 now serve as wrench engaging surfaces. The legs 14 extend downwardly with the round surfaces 22 projecting slightly outwardly of the wrench engaging portions and with the surfaces 18 forming two opposite sides of the slot 38. The curved portion 20 now comprises the two inclined surfaces 40 on the inner end of the slot.

Following the operation in which the blank is bent into the U-shape form, threads 42 are formed on the two round surfaces 22 as shown in Figs. 13 and 14. The threads may be formed by a stamping operation or may be produced by means of a rotating die, either of which methods are well known to those skilled in the art. When pressure is applied to form the threads the surfaces 18 may be sharply defined by pressure against the two parallel sides of the mandrel inserted in the slot during the thread pressing operation.

Various additional modifications in the method of forming the blank illustrated in Figs. 9 and 10 are possible. After each cold working of the metal we have found it desirable to anneal the metal by heat which we have discovered will prevent cracking the metal during a subsequent bending. A less controlled annealing is necessary when making the 10c modification as compared to the 10a and 10b types.

The slotted bolt thus formed when made of suitable material may be employed in an electrical connector of the type disclosed in the Dibner patents by assembling it with a nut 44 which is bored and threaded to be received on the threads 42 of the bolt as is illustrated in Fig. 15. A follower 46 is mounted in the bore of the nut in such manner that it does not become displaced and so that it moves in the slot 38 when the nut is rotated on the bolt. The upper surface 48 of the follower cooperates with the surfaces 40 on the under side of the head of the bolt at the inner end of the slot to clamp conducting wires or cables between the follower and the bolt.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all instrumentalities coming within the scope of the appended claims, and by means of which, objects of our invention are attained and new results accomplished, as it is obvious that the particular embodiments herein shown and described are only some of the many that can be employed to attain these objects and accomplish these results.

We claim:
1. The method of producing without scrap a slotted bolt provided with a head portion and two extending partially cylindrical threaded leg portions forming a slot therebetween, which comprises forming a continuous rod of suitable material having a uniform cross-sectional area corresponding to the exact cross-sectional area of one of the bolt portions, cutting off a length of the rod having the exact volume of the completed slotted bolt, applying pressure to the two ends of the cut-off piece, causing the metal to flow and be redistributed to form a longitudinally extending blank provided with two end portions having the exact cross-sectional area of the leg portions of the slotted bolt, and an intermediate portion of greater cross-section than the end portions; laterally swedging two sides of the entire length of the blank to provide a plurality of concave faces therein, the axes of which are perpendicular to the longitudinal axis of the blank, and simultaneously reshaping each of the leg portions to provide a partially cylindrical surface on one side and a flat surface on the other, all of said surfaces and faces being the original worked surfaces of the rod, thereafter bending the intermediate portion at the concave faces to form the slotted bolt, and finally threading the rounded partially cylindrical surfaces of the leg portions for receiving a nut.

2. The method of claim 1, wherein the rod is rectangular in cross-section with a width and thickness equal substantially to that of the head of the slotted bolt and suitable for bending, with the cut-off piece having a length which is less than the overall longitudinal length of the slotted bolt when flat.

References Cited in the file of this patent

UNITED STATES PATENTS

| | | |
|---|---|---|
| Re. 20,096 | Dibner | Sept. 8, 1936 |
| 1,091,415 | Wilzin | Mar. 24, 1914 |
| 1,900,049 | Ellison | Mar. 7, 1933 |
| 1,947,867 | Mebold | Feb. 20, 1934 |

FOREIGN PATENTS

| | | |
|---|---|---|
| 622,558 | Great Britain | May 4, 1949 |